UNITED STATES PATENT OFFICE.

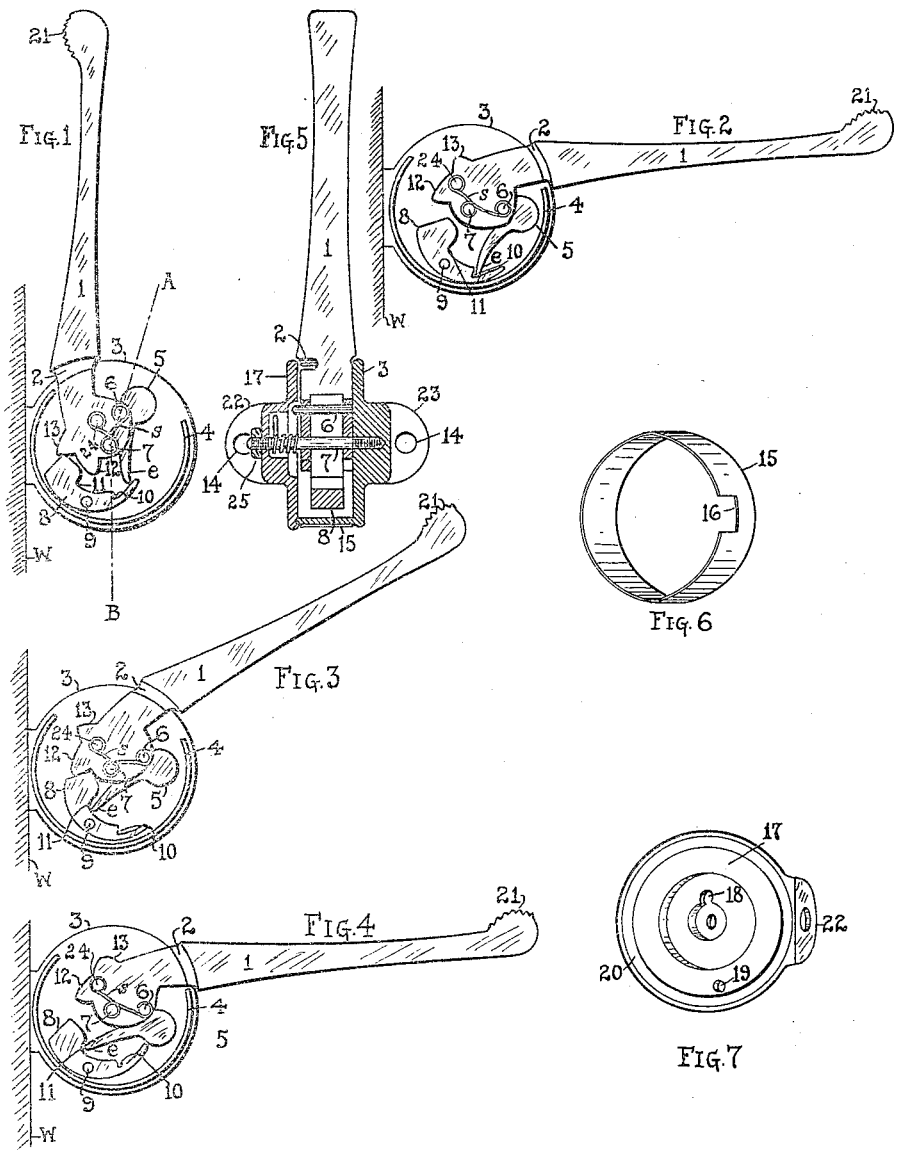

PAUL J. LANDEMARE, OF NEWARK, AND STEPHEN DINGLE, OF BELLEVILLE, NEW JERSEY.

SELF-RESTORING HOOK.

1,128,614. Specification of Letters Patent. Patented Feb. 16, 1915.

Application filed September 8, 1914. Serial No. 860,789.

*To all whom it may concern:*

Be it known that we, PAUL J. LANDEMARE and STEPHEN DINGLE, citizens of the United States, residing at Newark and Belleville, respectively, in the county of Essex, State of New Jersey, have invented certain new and useful Improvements in Self-Restoring Hooks, of which the following is a specification.

This invention relates to improvements in hooks, or hangers, which are self restoring; that is, those that will return automatically to a certain normal position after the article has been removed from the hook.

One of the objects is to provide a hook which can be used on the back of chairs or seats, such as are used in theaters, churches and other assembly halls, for the purpose of hanging hats and wraps thereon and when said articles are removed, the hook will return automatically to a position which will be out of the way to a person passing in behind said chair or seat. A further use for an automatic hook is found in closets, halls and such places; where the ordinary hooks, projecting outwardly as they do all the time, are in the way.

A further object is to provide an automatic hook which is simple in operation and easy to manufacture.

Other objects and uses will be apparent to one skilled in the art.

We accomplish the objects of our invention by the mechanism illustrated in the accompanying drawing in which—

Figure 1 is a side view of our improved hook in its normal or inoperated position, but with one of the supporting flanges removed. Fig. 2 is a view similar to Fig. 1 but with the hook pulled down for the purpose of hanging an article thereon. Fig. 3 is similar to Fig. 2, except the hook is shown in a partially returned position and the operating mechanism is a different arrangement. Fig. 4 shows the hook in same position as Fig. 2, but the operating mechanism in a different position than in any of the other figures. Fig. 5 is a section on line A B of Fig. 1. Fig. 6 is a view of the means used to close the opening between the two flanges made by the hook lever. Fig. 7 is a view of the flanges as removed from Fig. 1.

Referring now particularly to the various views of the drawing in which like characters of reference indicate like parts, 1 is the hook lever which is mounted between two flanges, 3 and 17, on the pivot 7. The hook 1 has its end knurled as indicated at 21 to help retain the articles thereon. It may also be turned up like the ordinary hook. A groove 2 is provided to receive the recess 16 of ring 15 which fits over the rim 4 of flange 3. The outer edge of the ring 15 fits within the annular recess 20 of the flange 17. It will thus be seen that the ring 15 closes the opening cut in rim 4 for the hook 1 and since the slot 16 engages groove 2 of the hook, the ring 15 rotates with the hook 1. The flanges 3 and 17 have ears 23 and 22 with holes 14 therein for fastening the hook to the seat, wall or other object it is to be used on. Supported on the pivot bearing 7 is a spring $s$, one end of which is attached to the hook 1 at 24 and the other end is formed to drop into the recess 18 in flange 17, which, when in place is held there by the pin entering the dowel hole 19 and by the nut 25. The hook 1 carries a pawl 5 on pivot 6. Mounted on pin 9 which is attached to flange 3 is another pawl 8.

The object of the pawls will be apparent in the following description of the operation of the hook:—When it is desired to use the hook, it is pulled down to the position of Fig. 2. In passing to this position the end $e$ of pawl 5 engages the notched portion 10 of pawl 8, tipping the same into the position shown in Fig. 2, where it is seen that the large end of pawl 8 is below and in line with the path of the projection 12 of hook 1. On removing the hand from the lever 1 it is returned by spring $s$ to a partially operated position, as shown in Fig. 3, where it is seen that the large end of pawl 8 engages the projection 12 on the lever 1 and stops its further upward movement. At the same time the end of pawl 5 leaves the notch 10 of pawl 8 and moves into the notch 11, of pawl 8. Now when the article is hung on the hook, in position of Fig. 3, the lever 1 comes down to a horizontal position as shown in Fig. 4. In moving to this position from that of Fig. 3 the pawl 5 pushes the pawl 8 out of the path of the hook lever projection 12 and leaves the hook in a position to be restored by the spring $s$, when the article is removed therefrom. When the article is removed from the lever, it goes back to the position of Fig. 1, the large end of pawl 8 engaging the projection 13 on the lever 1 to serve as a stop. When the hook is in the position of Fig. 4, the pawls 5 and 8 interlock so as to provide an additional stop with the rim 4 which is cut away as shown. It will then be seen that we provide an automatic self restoring hook, which is easily installed and simple in operation.

While we have shown one form of construction, it will be apparent to one skilled in the art that numerous changes in details can be made without departing from the spirit of our invention or the scope of the appended claims.

What we claim is:—

1. In a device of the character described, the combination of a hook lever, a frame member carrying a pivot for said lever, a second frame member adapted to be held adjacent to the first frame member by means carried on said pivot, said pivot also supporting means for operating the lever and means housed within the frame members for preventing said hook lever from returning directly to normal position after being operated, substantially as described.

2. In a device of the character described, the combination of a frame member and a flange integral therewith, said flange having an opening therein, a pivot attached to said frame member, a hook lever carried by said pivot, a second frame member adapted to receive said flange, a ring adapted to fit over said flange, to close said opening therein and being rotatable with said hook lever, substantially as described.

3. In a device of the character described the combination of a hook lever, frame members for supporting said lever, said lever having three positions in its cycle of operation, a normal position, a partially operated and a fully operated position, substantially as and for the purpose described.

4. In a device of the character described, the combination of a hook lever, a mounting therefor, means acting to return the hook lever to its normal position after being set for use and means to prevent such return until after a further partial movement of said hook, substantially as and for the purpose described.

5. In a device of the class described, the combination of a hook lever and a support therefor, means set when the hook is pulled to its working position, to prevent the return of said hook lever to its normal position, until said hook lever is partially operated a second time, substantially as described.

6. In a device of the class described, the combination of a lever, a pivoted support therefor, means carried by said lever for setting means to prevent the return of said lever to its normal position after being fully operated, said first means then serving to trip the second means whereby the lever is set to return to its normal position, substantially as described.

7. In a device of the class described, the combination of a lever, a pivotal support therefor, means for returning the lever to its normal position after it has been operated, means operated by said lever for setting means to prevent the return of said lever, said second mentioned means serving to remove the third mentioned means on the partial operation of the lever, whereby the lever may be restored to its normal position, substantially as described.

8. In a device of the class described, the combination of a lever, a pivotal support therefor, a pawl carried by said lever, a frame member and a pawl mounted thereon, said first pawl acting on the second pawl when the lever is operated to move the same into a position to prevent the complete return of said lever to its normal position, said second pawl being restored to its normal position by further operation of the lever, whereby the lever will return to its normal position at the proper time, substantially as described.

9. In a device of the class described, the combination of a frame member carrying two pivot supports, a hook lever mounted on one of said pivots, a pawl mounted on said second pivot, said pawl having two notches adapted to be engaged by a second pawl operated by said hook lever, the engagement with the first of said notches serving to move said pawl into a position whereby said pawl prevents the return of the hook lever to its normal position and the engagement of the second of said notches by the second pawl serving to trip the first pawl out of the path of the hook lever whereby the lever may be returned to its normal position, and means to return the hook switch to its normal position, substantially as described.

10. In a device of the class described, the combination of a frame member having a flange thereon, a second frame member adapted to receive said flange forming a housing thereby, a hook lever mounted on a pivot supported by said frame member and extending through an opening in said flange, means for closing the opening in said flange, and means contained within the housing for causing the lever to maintain first its normal position, second, a partially operated position, when so set, third, to return to its normal position after being set to full position from the partially operated position, substantially as described.

11. In a device of the class described, the combination of two frame members and means to secure them in position, a hook lever pivoted between said members, means supported on said hook lever pivot for returning said hook after same is operated by an external force, one end of said means being attached to said hook and the other to one of said frame members, a pawl pivoted on the other of said frame members, a second pawl pivoted on said hook lever, said pawls coacting to cause the hook lever to be operated in a regular sequence of positions, substantially as described.

12. In a device of the class described, the combination of two frame members, having a hook lever pivoted therebetween, a pawl carried on one of said frame members, said hook lever having two notches thereon, one of said notches engaging said pawl to act as a stop for the lever in the normal position, the other of said notches engaging said pawl to hold the lever in a partially operated position and a second pawl operated by said lever to move the first mentioned pawl into its different positions, substantially as and for the purpose described.

13. In a device of the class described, the combination of a hook lever and a pivotal mounting therefor, means to hold said lever in a vertical position, said means also serving to hold said lever at an acute angle after being moved to substantially a horiozntal position by an external force and means operated by the lever for moving the first mentioned means out of the path of the lever whereby it may be returned to a vertical position after the external force is removed, substantially as described.

In testimony whereof we have signed this specification in the presence of two witnesses.

PAUL J. LANDEMARE.
STEPHEN DINGLE.

Witnesses:
QUEENIE LANDEMARE,
EUGENIE DINGLE.

Copies of this patent may be obtained for five cents each, by addressing the "Commissioner of Patents, Washington, D. C."